(12) United States Patent
Cawthorne et al.

(10) Patent No.: US 11,167,864 B2
(45) Date of Patent: Nov. 9, 2021

(54) APPLYING COLD SPRAY EROSION PROTECTION TO AN AIRFOIL

(71) Applicant: The Boeing Company, Chicago, IL (US)

(72) Inventors: Matthew H. Cawthorne, Wayne, PA (US); Bruno Zamorano Senderos, Huntsville, AL (US); Kenneth W. Young, Bear, DE (US)

(73) Assignee: The Boeing Company, Chicago, IL (US)

( * ) Notice: Subject to any disclaimer, the term of this patent is extended or adjusted under 35 U.S.C. 154(b) by 648 days.

(21) Appl. No.: 15/964,600

(22) Filed: Apr. 27, 2018

(65) Prior Publication Data

US 2019/0329906 A1    Oct. 31, 2019

(51) Int. Cl.
| | |
|---|---|
| *B64F 5/10* | (2017.01) |
| *C23C 24/04* | (2006.01) |
| *B64C 27/473* | (2006.01) |
| *B05B 7/14* | (2006.01) |
| *B64C 11/20* | (2006.01) |
| *B64D 45/00* | (2006.01) |
| *B05D 1/08* | (2006.01) |
| *B22F 10/25* | (2021.01) |
| *B05D 1/10* | (2006.01) |
| *B05D 1/12* | (2006.01) |

(52) U.S. Cl.
CPC .............. *B64F 5/10* (2017.01); *B05B 7/1486* (2013.01); *B64C 11/205* (2013.01); *B64C 27/473* (2013.01); *C23C 24/04* (2013.01); *B05D 1/08* (2013.01); *B05D 1/10* (2013.01); *B05D 1/12* (2013.01); *B22F 10/25* (2021.01); *B64C 2027/4736* (2013.01); *B64D 2045/009* (2013.01)

(58) Field of Classification Search
USPC .................................. 427/422, 446, 454–456
See application file for complete search history.

(56) References Cited

U.S. PATENT DOCUMENTS

| | | | | |
|---|---|---|---|---|
| 5,302,414 | A | * | 4/1994 | Alkhimov ............... B05B 7/144 427/191 |
| 7,066,375 | B2 | * | 6/2006 | Bolser ................ B23K 20/1265 228/114 |
| 7,543,764 | B2 | * | 6/2009 | Haynes ..................... B05B 1/00 239/601 |
| 8,247,050 | B2 | * | 8/2012 | McCrea .............. C23C 18/2006 428/35.8 |

(Continued)

FOREIGN PATENT DOCUMENTS

EP    3401419    * 11/2018 ............. C23C 24/04

*Primary Examiner* — Brian K Talbot
(74) *Attorney, Agent, or Firm* — Duft & Bornsen, PC

(57) ABSTRACT

Systems and methods are provided for applying cold spray erosion protection to an airfoil. One embodiment is a method for applying an abrasion coating to a fiber-reinforced composite substrate. The method includes applying a bond layer to the fiber-reinforced composite substrate by emitting, with a supersonic nozzle of a High Pressure Cold Spray (HPCS) system, a first gas stream including a first metal powder at a first speed below supersonic speed. The method further includes applying a cold spray deposit layer to the bond layer by emitting, with the supersonic nozzle, a second gas stream including a second metal powder at a second speed above supersonic speed.

20 Claims, 4 Drawing Sheets

(56) References Cited

U.S. PATENT DOCUMENTS

| | | | |
|---|---|---|---|
| 9,079,209 B2* | 7/2015 | Kim | B05B 5/032 |
| 9,885,244 B2* | 2/2018 | Kray | C22C 19/057 |
| 2003/0232132 A1 | 12/2003 | Muehlberger | |
| 2006/0134321 A1* | 6/2006 | DeBiccari | C23C 24/04 |
| | | | 427/140 |
| 2006/0216428 A1* | 9/2006 | DeBiccari | F01D 5/288 |
| | | | 427/446 |
| 2006/0222776 A1 | 10/2006 | Madhava et al. | |
| 2008/0253887 A1 | 10/2008 | Cairo et al. | |
| 2009/0029180 A1* | 1/2009 | Oguri | C08J 7/044 |
| | | | 428/457 |
| 2011/0129600 A1 | 6/2011 | Das et al. | |
| 2013/0295326 A1* | 11/2013 | Doesburg | C09D 1/00 |
| | | | 428/138 |
| 2016/0102394 A1* | 4/2016 | Xiong | C23C 24/04 |
| | | | 427/456 |
| 2017/0165906 A1* | 6/2017 | Alms | B32B 7/12 |
| 2018/0045216 A1* | 2/2018 | Karlen | F04D 29/542 |
| 2019/0233946 A1* | 8/2019 | Bruton | C23C 28/341 |

\* cited by examiner

APPLYING COLD SPRAY EROSION PROTECTION TO AN AIRFOIL

FIELD

The disclosure relates to the field of airfoils, and in particular, to erosion protection of airfoils.

BACKGROUND

An airfoil, such as a rotor blade of a helicopter, is typically made out of some combination of composite structures and/or various metals. The leading edge of the rotor blade includes a metal strip of stainless steel, nickel, or titanium to protect against rain and sand particles where erosive effects are greatest. Currently, the metal strip is installed onto the rotor blade by shaping it to conform to the contoured surface of the leading edge and using an adhesive material such as epoxy film to bond it to the leading edge. Some rotor blades such as H-47 use the fabricated erosion protection in the tooling to then bond and build the composite leading edge structure instead of bonding it on after the fact. However, due to tolerances on tooling and fabrication, in shaping and bonding the metal strip to the complex shape of the leading edge in this manner, it is difficult to ensure that the adhesive is of uniform thickness and free of air throughout the leading edge in order to provide a strong bond that is free of defects. Moreover, manufacture of the rotor blade and replacement of the metal strip require complex tooling and high fabrication costs.

SUMMARY

Embodiments described herein use gas dynamic cold spray to build or repair an erosion protection layer on an airfoil of an aircraft, such as a rotor blade, propeller, or wing. In particular, described herein are techniques for operating a High Pressure Cold Spray (HPCS) system to build erosion protection directly on a fiber-reinforced composite (FRC) structure, thereby eliminating the difficult epoxy bonding step and, for repair applications, avoiding entire part replacement of the abrasion shield.

One embodiment is a method for applying an abrasion coating to a fiber-reinforced composite substrate. The method includes applying a bond layer to the fiber-reinforced composite substrate by emitting, with a supersonic nozzle of a High Pressure Cold Spray (HPCS) system, a first gas stream including a first metal powder at a first speed below supersonic speed. The method further includes applying a cold spray deposit layer to the bond layer by emitting, with the supersonic nozzle, a second gas stream including a second metal powder at a second speed above supersonic speed.

In a further embodiment, the method includes setting a heater of the HPCS system to a first temperature between 200-300 degrees Celsius for applying the bond layer, and increasing the heater to a second temperature between 300-1,000 degrees Celsius for applying the cold spray deposit layer. In yet a further embodiment, the method includes setting a gas pressure of the HPCS system to a first pressure between 100-400 pounds per square inch (psi) for applying the bond layer, and increasing the gas pressure of the HPCS system to a second pressure between 300-1,000 psi for applying the cold spray deposit layer. In a further embodiment, the method includes increasing a standoff distance of the supersonic nozzle from approximately 1.5 inches for the bond layer to approximately 1 inch for the cold spray deposit layer.

In further embodiments, the fiber-reinforced composite substrate includes a thermoplastic resin matrix of Polyetheretherketone (PEEK), and the fiber-reinforced composite substrate includes a resin portion on top of the PEEK, the resin portion having a layer thickness between 0.001 to 0.10 inches. In a further embodiment, the fiber-reinforced composite substrate includes a leading edge of an aircraft airfoil. In still a further embodiment, the first metal powder includes a majority of non-spherical particles and a minority of spherical particles, and the second metal powder includes a majority of spherical particles and a minority of non-spherical particles. In yet a further embodiment, particles of the first metal powder have a tensile modulus in a range between 5-15 million pounds per square inch (msi), and particles of the second metal powder have a tensile modulus in a range between 10-60 msi. In a further embodiment, the first metal powder is one or more of aluminum, titanium, and niobium.

Another embodiment is a High Pressure Cold Spray (HPCS) system that includes a supersonic nozzle configured to emit particles in a gas stream at supersonic speed toward a fiber-reinforced composite substrate, and a controller configured to direct the HPCS system to apply a bond layer to the fiber-reinforced composite substrate by emitting a first gas stream including a first metal powder from the supersonic nozzle at a first speed below supersonic speed, and to apply a cold spray deposit layer to the bond layer by emitting a second gas stream including a second metal powder from the supersonic nozzle at a second speed above supersonic speed.

In a further embodiment, the controller configured to set a heater of the HPCS system to a first temperature between 200-300 degrees Celsius for applying the bond layer, and to increase the heater to a second temperature between 300-1,000 degrees Celsius for applying the cold spray deposit layer. In still a further embodiment, the controller configured to set a gas pressure of the HPCS system to a first pressure between 100-400 pounds per square inch (psi) for applying the bond layer, and to increase the gas pressure of the HPCS system to a second pressure between 300-1,000 psi for applying the cold spray deposit layer.

Yet another embodiment is an airfoil of an aircraft, the airfoil includes a core, a leading edge, and an abrasion coating on the leading edge. The abrasion coating includes a bond layer applied to the leading edge via a High Pressure Cold Spray (HPCS) system, and a cold spray deposit layer applied to the bond layer via the HPCS system.

In a further embodiment, the bond layer is applied by the HPCS system by emitting a first gas stream including a first metal powder at a first speed below supersonic speed, and the cold spray deposit layer is applied by the HPCS system by emitting a second gas stream including a second metal powder at a second speed above supersonic speed. In another embodiment, the bond layer includes one or more of aluminum, titanium, and niobium. In a further embodiment, particles of the bond layer have a tensile modulus in a range between 5-15 million pounds per square inch (msi), and particles of the cold spray deposit layer have a tensile modulus in a range between 10-60 msi. In a further embodiment, the bond layer includes a majority of non-spherical particles and a minority of spherical particles, and the cold spray deposit layer includes a majority of spherical particles and a minority of non-spherical particles. In still a further embodiment, the leading edge includes a thermoplastic resin matrix of Polyetheretherketone (PEEK), and the leading edge includes a resin portion on top of the PEEK, the resin portion having a layer thickness between 0.001 to 0.10 inches.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
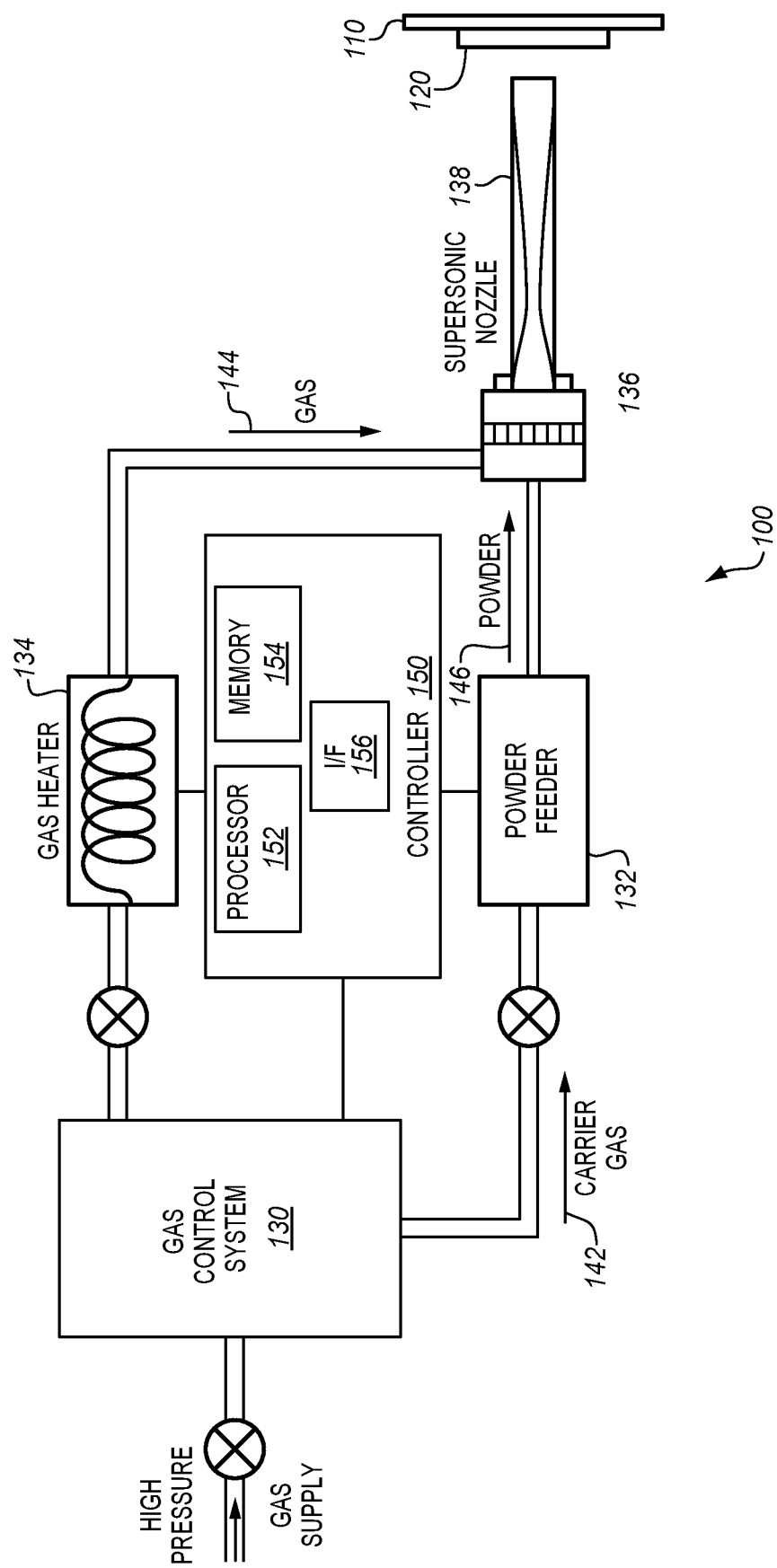
FIG. 1 is a diagram of a High Pressure Cold Spray (HPCS) system in an illustrative embodiment.

FIG. 1 is a diagram of a High Pressure Cold Spray (HPCS) system 100 in an illustrative embodiment. Generally, the HPCS system 100 may be used in additive manufacturing to build structural components layer-by-layer. The HPCS system 100 causes solid-state particles to impact a substrate 110 at high velocities to create a deposition layer 120 or coating. Unlike a Low Pressure Cold Spray (LPCS) system, the HPCS system 100 is configured to accelerate particles to multiple times the speed of sound in a jet of compressed gas. The HPCS system 100 is further contrasted from an LPCS system by differences in, gas pressure, gas temperature, and powder injection location. Additionally, compared with an LPCS system, the HPCS system 100 has a higher range of nozzle geometries available for use based on the high pressure flow characteristics, making the deposit spray pattern influenced by the system used and providing for more control. As described in greater detail below, the HPCS system 110 and an LPCS system are both viable options for applying particular layers to the substrate 110 depending on the desired impact speed and materials used. The process is referred to as a "cold spray" because the particles are applied at a temperature that is well below their melting point, and it is the kinetic energy of the particles which causes them to plastically deform and bond with the substrate 110 rather than particle temperature. As will be described in greater detail below, the HPCS system 100 may be operated to build a metal layer directly on the composite structure of an airfoil (e.g., substrate 110 being non-metal), unlike previous cold spray techniques which results either in low strength bonding on non-metal substrates (e.g., conventional use of an LPCS system) or in erosion of the substrate and poor adhesion (e.g., conventional use of an HPCS system due to excessive impact speeds for polymer based substrates).

The HPCS system 100 includes a gas control system 130, a powder feeder 132, a heater 134, a mixing chamber 136, and a supersonic nozzle 138. Generally, the components 130-138 of the HPCS system 100 may be fluidly coupled to transport gas and particles. The gas control system 130 is any system, device, and/or components operable to control the pressure of gas (e.g., nitrogen, helium, or a mixture of the two) and thus control the acceleration of particles. The powder feeder 132 provides a powder 146 and is generally compatible with high gas pressures. The powder 146, initially carried by a separate, carrier gas stream 142, are injected into a mixing chamber 136 which also receives the main gas stream 144. The heater 134 is upstream from the mixing chamber 136 and may heat the main gas stream 144 to expand and pressurize the gas for particle acceleration. The particles of the powder 146 are accelerated by the main gas stream 144 through the supersonic nozzle 138 to impact the substrate 110.

The HPCS system 100 further includes a controller to control overall operation of the HPCS system 100. For example, the controller may be electronically coupled to the components 130-138 of the HPCS system 100 to control various process parameters, including but not limited to, gas pressure, type, and flow rate, heating temperature, powder selection and feed rate (i.e., particle concentration, size, and shape), nozzle angle, and nozzle standoff distance. As described in greater detail below, the HPCS system 100 is configured to adjust the process parameters to enhance cohesion and adhesion of particles on the substrate 110, and provides a technical benefit in enabling the application of erosion protection directly to a contoured surface of a complex-shaped composite structure, such as a fiber reinforced composite of an aircraft rotor blade, propeller, or fixed wing.

While the specific hardware implementation of the controller is subject to design choices, one particular embodiment may include one or more processors 152 coupled with memory 154. The processor 152 includes any hardware device that is able to perform functions, and may include one or more Central Processing Units (CPU), microprocessors, Digital Signal Processors (DSPs), Application-specific Integrated Circuits (ASICs), etc. Some examples of processors include Intel® Core ™ processors, Advanced Reduced Instruction Set Computing (RISC) Machines (ARM®) processors, etc. The memory 154 includes any hardware device that is able to store data, and may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. The controller may also include an interface 156 enabling user input or selection of process parameters via a graphical user interface (GUI), keyboard, or a hardware component or device (e.g., transceiver, antenna, etc.) configured to communicate over a network. Alternative or additional components of the HPCS system 100 are possible other than that explicitly shown and described, such as a dedicated gas compressor, pressure gauges, valves, etc.

Figure 2:
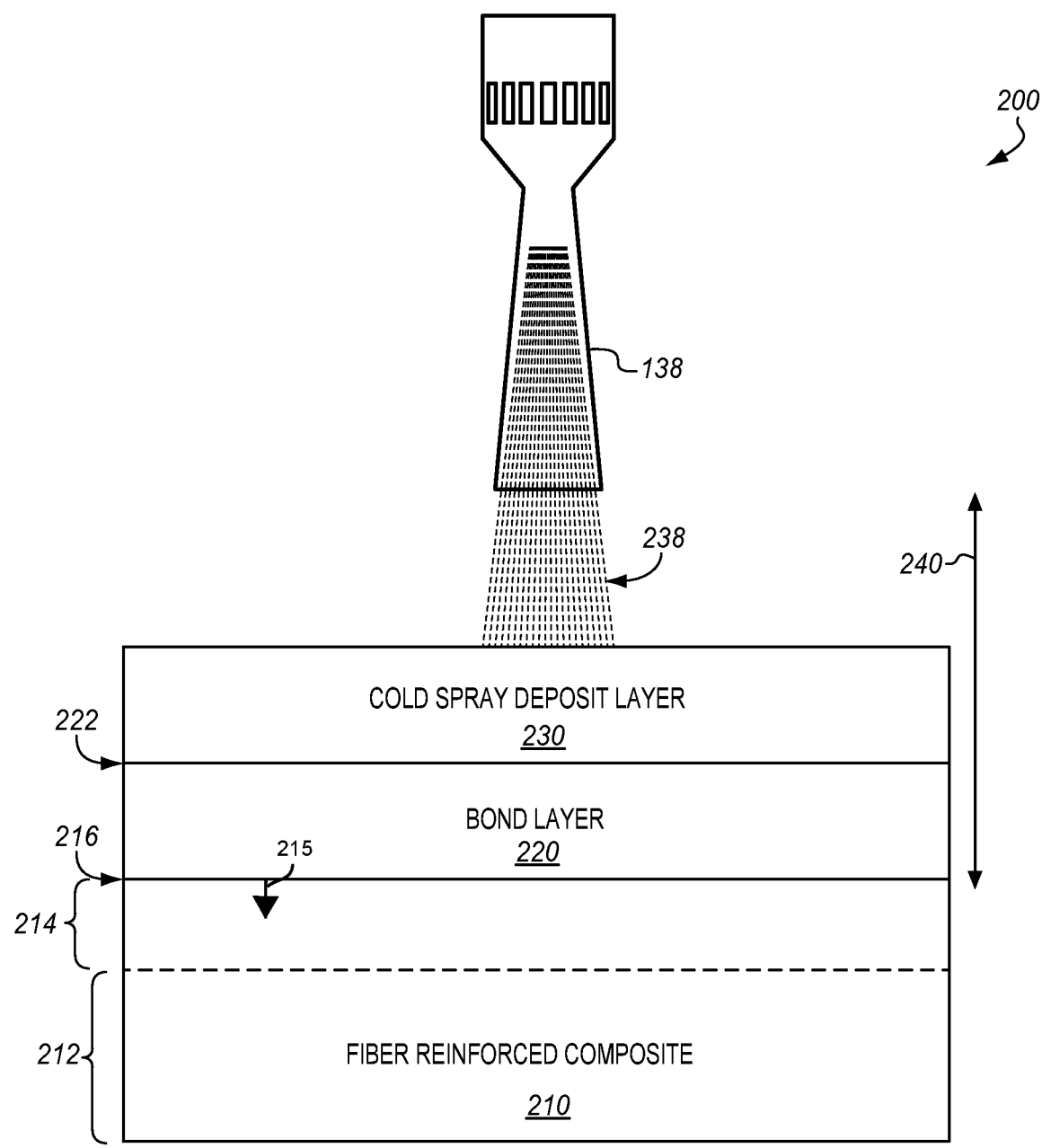
FIG. 2 is a diagram of a fiber-reinforced composite (FRC) with an applied bond layer and cold spray deposit layer in an illustrative embodiment.

FIG. 2 is a diagram 200 of a fiber-reinforced composite (FRC) 210 with an applied bond layer 220 and cold spray deposit layer 230 in an illustrative embodiment. The diagram 200 is an example for discussion purposes and is not to scale. In general, the FRC 210 may form the structure of an aircraft component, such as a rotor blade, propeller, or wing. The FRC 210 is provided proximate to the supersonic nozzle 138 for application of the bond layer 220 and/or the cold spray deposit layer 230 via a gas stream 238 of metallic powder ejected from the supersonic nozzle 138. A standoff distance 240 of the supersonic nozzle 138 may be defined by a distance between the outlet of the supersonic nozzle 138 and a top surface 216 of the FRC 210. The bond layer 220 is applied to the top surface 216 of the FRC 210, and the cold spray deposit layer 230 is applied to a top surface 222 of the bond layer 220.

As described in greater detail below, the bond layer 220 and the cold spray deposit layer 230 are applied with different process parameters. In general, the bond layer 220 provides a technical benefit by establishing a bond-specific surface which enhances adhesion of subsequent layers of metal deposition and transitioning from a polymer to a fully metal coating. And, the cold spray deposit layer 230 provides a technical benefit by establishing a metal coating with increased coating strength, ductility, damage tolerance, and durability. Additionally, the bond layer 220 decreases strain mismatch between the cold spray deposit layer 230 and the FRC 210 and/or resin portion 214. The cold spray deposit layer 230 may reduce strain mismatch by building a coating stiffness (e.g., low modulus) that may be enabled to transition to higher modulus coating for increased bond life.

The FRC 210 may include a resin portion 214 at or near the top surface 216, and also includes a fiber-reinforcement portion 212 underneath the resin portion 214. In general, the resin portion 214 may be matched to the fiber-reinforced composite resin for bonding and may also be compatible in terms of the cure temperature used to activate the bond. The resin portion 214 may include one or more resin layers with little or no volumes of fiber reinforcement (e.g., compared to the fiber-reinforcement portion 212) to promote metal particle embedding without fiber interference or damage. As one example, the resin portion 214 may be achieved by co-curing a surfacing film (e.g., the epoxy matrix composite has plies of uncured resin which are used to bond to the resin layer (e.g., thermoplastic surfacing ply) on the outside contour). In one embodiment, the resin portion 214 includes any suitable high-strain-capable and high-melting-point resin having a layer thickness between 0.001 to 0.10 inches. The fiber-reinforcement portion 212 may include any material including fibers with suitable strength and stiffness in a resin matrix. Examples of a thermoplastic resin matrix include Polyetheretherketone (PEEK), Polyetherketoneketone (PEKK), polyphenylene sulfide (PPS), Polycarbonates (PC), and Polyetherimide (PEI).

In general, the primary means of bonding may be achieved through the interfacial mixing of metal particles with the polymer resin. The resin portion 214 enables a low modulus (i.e., not stiff) region that permits particles to enter and become entrapped. The resin portion 214 is resin rich and generally thick enough to provide energy damping (as opposed to stiff fibers that resist particle impacts and reflect the energy so that the particles rebound and erode the surface). The bond layer 220 builds upon the initial mixing by steadily increasing the entrapped particles which increase in content and begin to bond to each other, creating networks of metal structure which are entangled with polymer networks. Although FIG. 2 shows discrete regions with linearly defined boundaries, in actuality the bond layer 220 is established by particles penetrating a depth 215 into the thickness of the resin portion 214. Subsequent layering of the bond layer 220 using a first cold spray powder and process parameters are what build up the bond layer 220. After that, the deposit layer transition begins using the second powder and process parameters. Similarly, the cold spray deposit layer 230 penetrates a depth into the bond layer 220. The depth penetrations generally vary across the horizontal boundaries. Also, the depths and the thickness of the resin portion 214 are variable depending on the specific materials used.

Embodiments described herein may apply to alternative thermoplastic structures including structures fully thermoplastic throughout the matrix, layered on top of a thermosetting matrix, or fully thermoset matrix composites such as epoxies. Since the supersonic nozzle 138 of the HPCS system 100 emits particles in a solid-state at a temperature below their melting point, process parameters may vary according to the particular structure and material of the FRC 210 to promote sufficient plastic deformation, adhesion, deposition efficiency, and bond uniformity while avoiding polymer erosion and damage.

Figure 3:
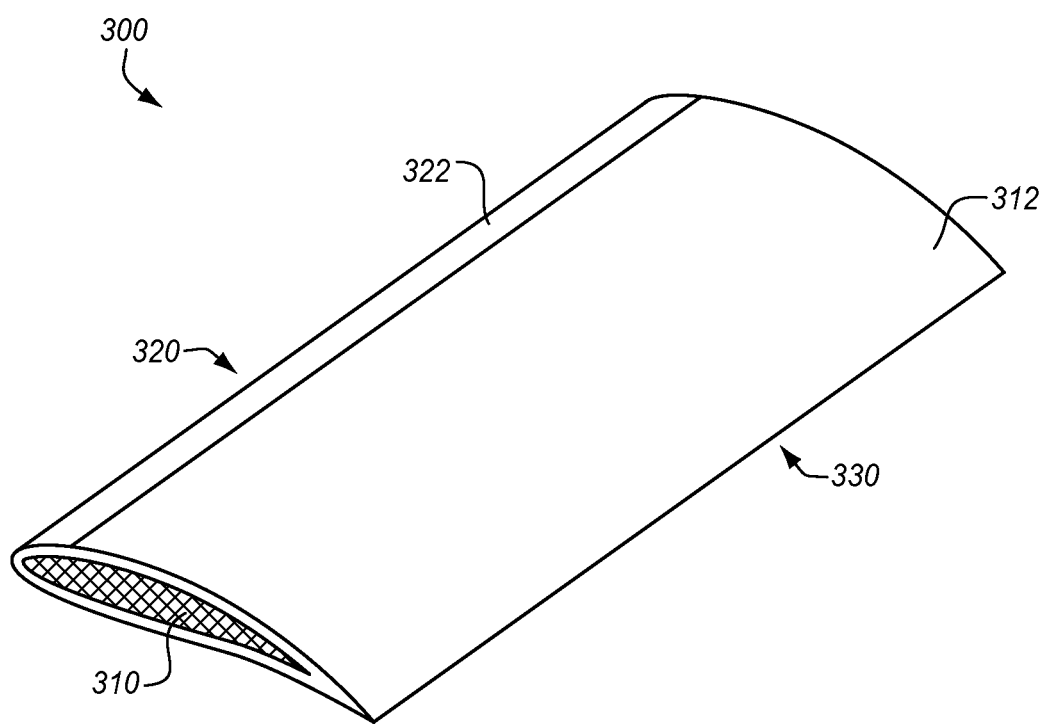
FIG. 3 is a perspective view of an airfoil of an aircraft in an illustrative embodiment.

FIG. 3 is a perspective view of an airfoil 300 of an aircraft in an illustrative embodiment. In this example, the airfoil 300 is a rotor blade that includes a core 310 that forms the inner structure of the rotor blade. The core 310 may include a spar, ribs, and other support members not shown for sake of brevity. The core 310 is wrapped with a skin 312 that covers the outer surface of the core 310. The core 310 and/or the skin 312 may include a thermoplastic or thermoset composite material (e.g., FRC 210).

The airfoil 300 further includes a leading edge 320 and a trailing edge 330. Degradation of the airfoil 300 and the leading edge 320 is improved by forming an abrasion coating 322 on the leading edge 320 using the HPCS system 100. That is, the cold spray deposit layer 230 and the bond layer 220 may form the abrasion coating 322 that is bonded to the FRC 210 along the leading edge 320 via gas dynamic cold spray. The abrasion coating 322 protects against environmental particles such as sand that tend to erode the leading edge 320 over time. As described in greater detail below, the HPCS system 100 may be used to manufacture or selectively restore worn portions of the abrasion coating 322 on the leading edge 320, thereby reducing time, complexity, and tooling cost for building or repairing the aircraft, while improving bond adhesion, erosion performance, control of aerodynamic dimensions, and thickness of the abrasion coating 322 for durability. Illustrative details of the operation of the HPCS system 100 will be discussed with regard to FIG. 4.

Figure 4:
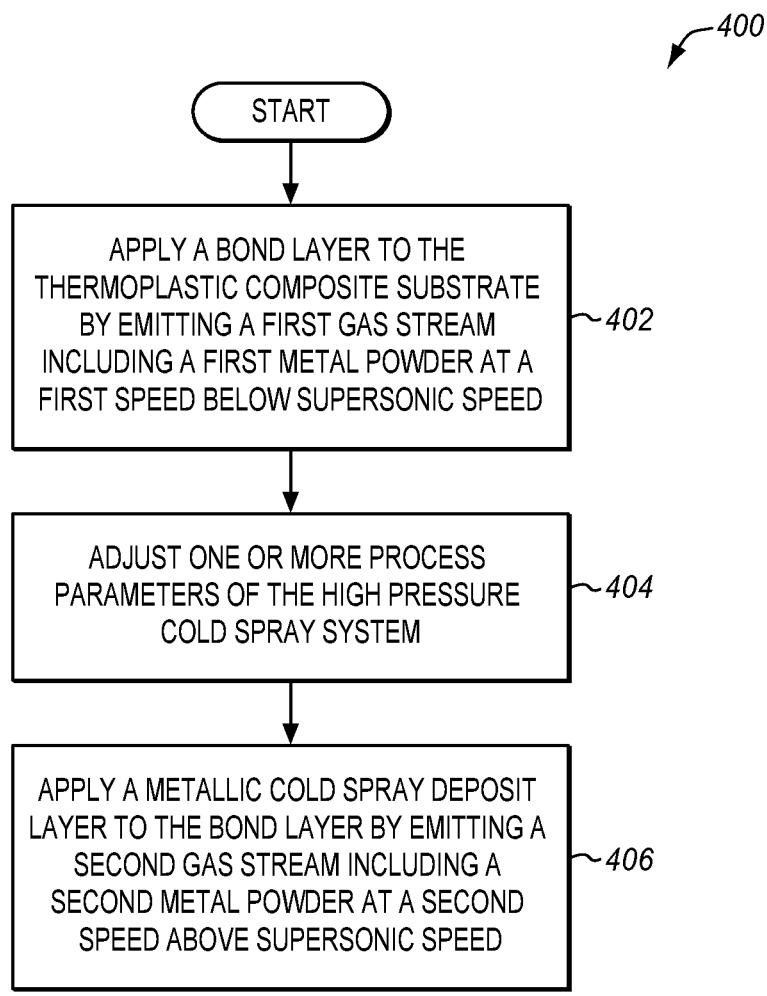
FIG. 4 is a flowchart illustrating a method for applying an abrasion coating to the leading edge of an airfoil in an illustrative embodiment.

FIG. 4 is a flowchart illustrating a method 400 for applying the abrasion coating 322 to the leading edge 320 of an airfoil 300 in an illustrative embodiment. The steps of method 400 are described with reference to the HPCS system 100 of FIG. 1, but those skilled in the art will appreciate that the method 400 may be performed in other systems. The steps of the flowcharts described herein are not all inclusive and may include other steps not shown. The steps described herein may also be performed in an alternative order. Assume, for this embodiment, that the FRC 210, and/or the leading edge 320 of the airfoil 300 is provided underneath the supersonic nozzle 138 for application of the bond layer 220 and/or the cold spray deposit layer 230.

In step 402, the HPCS system 100 applies the bond layer 220 to the FRC 210 by emitting a first gas stream including a first metal powder from the supersonic nozzle 138 at a first speed that is below supersonic speed. Supersonic speed refers to the speed of sound which is approximately 768 miles per hour (mph) or 343 meters per second (m/s) at sea level. Particle speeds may be expressed as a Mach number, with Mach 1 being the speed of sound (subsonic), Mach 0.5 being 50% of the speed of sound, Mach 1.5 being 50% faster than the speed of sound (supersonic), etc.

The specific velocity of the first gas stream including the first metal powder may vary based on material properties (e.g., tensile strength, hardness, etc.) of the FRC 210 and characteristics (e.g., splat behavior) of the first metal powder particles. In one embodiment, the first metal powder includes metal particles of aluminum (e.g., Al alloys), titanium (e.g., Ti alloys), and/or niobium that are relatively soft or which have a relatively low tensile modulus (e.g., 5-15 million pounds per square inch (msi)). In one embodiment, the HPCS system 100 may emit the softer metal particles in the first gas stream at or near Mach 0.6. As such, the HPCS system 100 may be controlled to create the bond layer 220 by discharging soft metal particles from the supersonic nozzle 138 at a subsonic particle velocity. This enables particles of the first metal powder to embed at a relatively shallow depth of the FRC 210 in the resin portion 214 without ballistically damaging the matrix and/or fibers of the fiber-reinforcement portion 212. Alternatively or additionally, the nozzle geometry (e.g., expansion ratio) may be adjusted to tailor speeds to match resin/particle interaction for interfacial mixing (e.g., sufficient particle depth in resin with large contact surface area. A technical benefit is thus provided in that the initial metal layer(s) deposited by the HPCS system 100 mix with composite resin to form an enhanced bond with the FRC 210 and establish a transitioning base that protects the FRC 210 from damage and provides resistance to deformation for subsequent build layers of the metal coating.

In some embodiments, the HPCS system 100 or an LPCS system may emit the first gas stream including the first metal powder from its nozzle at a speed that is in a range between 0.5 Mach and 1.5 Mach. For example, step 402 may be performed by an independent Low Pressure Cold Spray (LPCS) system and the HPCS system 100 may be subsequently used to apply the cold spray deposit layer 230. In other embodiments, step 402 may repeat as desired with adjustments to the pressure temperature and/or particle size between the repetitions to improve adhesion.

The HPCS system 100 (or an LPCS system) may apply one or more layers of the bond layer 220 to provide a sufficient thickness for promoting metal particle embedding without fiber interference or fiber damage. In one embodiment, the bond layer 220 has a layer thickness between 0.001 to 0.05 inches. In a further embodiment, the first metal particle powders of the first gas stream include a relatively large number (e.g., a majority or more than 50%) of non-spherical particle shapes and a relatively small number (e.g., a minority or less than 50%) of spherical particles shapes. For example, grinded powders instead of gas atomized powder may be used for their irregular shapes. In another embodiment, the standoff distance 240 of the supersonic nozzle 138 is equal to or approximately 1.5 inches during application of the bond layer 220. In yet another embodiment, the HPCS system 100 (or an LPCS system) sets the heater 134 at 200-300 degrees Celsius and the gas pressure at 100-400 pounds per square inch (psi) for application of the bond layer 220. In a further embodiment, the HPCS system 100 controls particle concentration (e.g., via powder feed rate and/or gun traverse speed) to create the bond layer 220 to have a relatively large particle size distribution (e.g., 20-80 micrometers). Various combinations of such process parameters may be applied to the HPCS system 100 for creation of the bond layer 220 to increase cohesive bond strength and avoid damage to the composite structure of the FRC 210.

In step 404, the HPCS system 100 adjusts one or more process parameters. As already described above, process parameters include, but is not limited to, gas pressure, type, and flow rate, particle velocity, heating temperature, powder selection and feed rate (i.e., particle concentration, size, and shape), nozzle angle, and nozzle standoff distance. The process parameters may be automatically adjusted by the HPCS system 100 between application of the bond layer 220 and application of the cold spray deposit layer 230. Alternatively or additionally, the process parameters may be adjusted by an operator of the HPCS system 100. The particular combination of adjustments and/or particular adjustment values may vary according to material properties (e.g., tensile strength, hardness, thickness of resin portion 214, etc.) of the FRC 210, characteristics of the selected powder particles, etc. Further examples are described below.

In step 406, the HPCS system 100 applies the cold spray deposit layer 230 to the bond layer 220 by emitting a second gas stream including a second metal powder from the supersonic nozzle 138 at a second speed that is above supersonic speed. Alternatively or additionally, for embodiments in which the bond layer 220 is applied (e.g., either by the HPCS system 100 or an LPCS system) at a first speed that is in a range between 0.5 Mach and 1.5 Mach, the HPCS system 100 creates the cold spray deposit layer 230 by emitting the second gas stream including the second metal powder at a second speed that is above the first speed. Accordingly, the HPCS system 100 may increase particle velocity for the second gas stream (i.e., to Mach 1 or greater) compared to the first gas stream. Alternatively or additionally, the HPCS system 100 may direct adjustments of other process parameters for the second gas stream as compared to the first gas stream as further described below.

The specific supersonic velocity of the second gas stream including the second metal powder may vary based on material properties of the FRC 210, characteristics of the first metal powder particles selected for the bond layer 220, and/or characteristics of the second metal powder particles selected for the cold spray deposit layer 230. In one embodiment, the second metal powder includes metal particles of tungsten carbide, titanium, cobalt, steel, nickel, aluminum and/or niobium that are relatively hard or which have a relatively high tensile modulus (e.g., 10-60 (msi)). Higher modulus material examples may require a more gradual transition and further distance from the bond interface for improved bonding, and the HPCS system 100 may accommodate that custom architecture to its advantage. The HPCS system 100 may thus transition to higher modulus or harder particles (i.e., relative to the bond layer 220) to build the cold spray deposit layer 230 to a desired strength, ductility, damage tolerance, and durability for the abrasion coating 322.

The HPCS system 100 may apply the cold spray deposit layer 230 to a suitable layer thickness for the abrasion coating 322 (e.g., 0.005 to 0.200 inches). Each layer of the cold spray deposit layer 230 may have a thickness between 0.001 to 0.005 inches. In one embodiment, the HPCS system 100 transitions from non-spherical particle shapes for the bond layer 220 to spherical particle shapes for the cold spray deposit layer 230. In other words, the second particle powders of the second gas stream include a relatively small number (e.g., less than 50%) of non-spherical particle shapes and a relatively large number (e.g., more than 50%) of spherical particles shapes as compared to that of the first particle powders of the first gas stream.

In another embodiment, the standoff distance 240 of the supersonic nozzle 138 is decreased to a distance that is equal to or approximately 1 inch during application of the cold spray deposit layer 230. In yet another embodiment, the HPCS system 100 sets the heater 134 at 300-1,000 degrees Celsius and the gas pressure at 300-1,000 psi for application of the cold spray deposit layer 230 (e.g., increased from 200-300 degrees Celsius and 100-400 psi, respectively, for the bond layer 220). In a further embodiment, the HPCS system 100 controls particle concentration to create the cold spray deposit layer 230 to have a relatively low particle size distribution. Various combinations of such process parameters may be applied to the HPCS system 100 for creation of the cold spray deposit layer 230 to permit high velocity particle impact to control defects (e.g., voids) and increase structural properties such as consolidation and cohesive bond strength. Steps 404 and 406 may repeat as desired to achieve particular results. In some embodiments, step 406 may repeat as desired with adjustments to the pressure temperature and/or particle size between the repetitions to improve consolidation and material properties.

Using the method 400, manufacture and/or repair of the abrasion coating 322 on the leading edge 320 of the airfoil 300 is possible. Advantageously, the HPCS system 100, which is capable of coating a large surface area (e.g., structures from 1 to 30 feet or even longer) having a varied surface geometry and/or transitions, may be used for the entire coating process, thereby eliminating complicated steps and combinations of expensive tooling previously used. Moreover, the additive manufacturing control of the HPCS system 100 is capable of meeting strict aerodynamic dimensional tolerances while depositing the abrasion coating 322 to have a large thickness throughout the leading edge 320 for durability. That is, the method 400 of cold spray direct deposit described herein has the ability to form complex geometries (e.g., at the outboard span (tip) region) for higher aerodynamic performance. Conventional metal strips are limited to select materials based on the relatively simple manufacturing methods used to fabricate them. Additionally, there are bond limitations in the conventional metallic leading edge processes due to the unreliable and often difficult or even possible (for some materials) to sufficiently prepare the metal part surfaces for bonding. Also, there is a high cost associated with secondarily bonding with cured film adhesives, and significant testing may be required to verify bond strength and proper failure mode so that the blade structural requirements are met.

Moreover, a variety of rotor blade leading edge fabrication techniques exist, and the method 400 described herein can support virtually any such technique in fabrication or repair of erosion protection. In addition to the functional role of this metallic material serving as erosion protection to the composite and providing for a long life component, there are inherent advantages to depositing as described herein. For example, the interfacial bond layer enables the cold spray deposit to achieve improved particle and particle layer cohesion for high erosion wear resistance, high strength, high ductility, reduced defects, etc.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for applying an abrasion coating to a fiber-reinforced composite substrate, the method comprising:
    applying a bond layer to the fiber-reinforced composite substrate by emitting a first gas stream including a first metal powder at a first speed below supersonic speed; and
    applying a cold spray deposit layer to the bond layer by emitting a second gas stream including a second metal powder at a second speed above supersonic speed.

2. The method of claim 1, further comprising:
    applying the bond layer with a supersonic nozzle of a High Pressure Cold Spray (HPCS) system; and
    applying the cold spray deposit layer with the supersonic nozzle of the HPCS system.

3. The method of claim 2, further comprising:
    setting a gas pressure of the HPCS system to a first pressure between 100-400 pounds per square inch (psi) for applying the bond layer; and
    setting the gas pressure of the HPCS system to a second pressure between 300-1,000 psi for applying the cold spray deposit layer.

4. The method of claim 2, further comprising:
    setting a standoff distance of the supersonic nozzle to approximately 1.5 inches for the bond layer and to approximately 1 inch for the cold spray deposit layer.

5. The method of claim 2, further comprising:
    setting a heater of the HPCS system to a first temperature between 200-300 degrees Celsius for applying the bond layer; and increasing the heater to a second temperature between 300-1,000 degrees Celsius for applying the cold spray deposit layer.

6. The method of claim 1, wherein:
the fiber-reinforced composite substrate includes a leading edge of an aircraft airfoil.

7. The method of claim 1, wherein:
the first metal powder includes a majority of non-spherical particles and a minority of spherical particles; and
the second metal powder includes a majority of spherical particles and a minority of non-spherical particles.

8. The method of claim 1, wherein:
the first metal powder has a tensile modulus in a range between 5-15 million pounds per square inch (msi); and
the second metal powder has a tensile modulus in a range between 10-60 msi.

9. The method of claim 1, wherein:
the first metal powder is one or more of aluminum, titanium, niobium, and alloys thereof.

10. The method of claim 1, wherein:
the second metal powder includes metal particles comprising one or more of tungsten carbide, titanium, cobalt, steel, nickel, aluminum, niobium, and alloys thereof.

11. The method of claim 1, wherein:
the fiber-reinforced composite substrate includes a thermoplastic resin matrix of Polyetheretherketone (PEEK); and
the fiber-reinforced composite substrate includes a resin portion on top of the PEEK, the resin portion having a layer thickness between 0.001 to 0.10 inches.

12. The method of claim 1, wherein:
the bond layer has a layer thickness between 0.001 to 0.05 inches.

13. The method of claim 1, wherein:
the cold spray deposit layer has a layer thickness between 0.005 to 0.200 inches.

14. The method of claim 1, further comprising:
setting the second speed of the second gas stream based on one or more properties of the fiber-reinforced composite substrate.

15. The method of claim 14, wherein:
the one or more properties of the fiber-reinforced composite substrate include at least one of a tensile strength, a hardness, and a thickness of a resin portion.

16. The method of claim 1, further comprising:
restoring a protective coating of an airfoil by applying the bond layer and the cold spray deposit layer.

17. The method of claim 1, further comprising:
controlling particle concentration in the first gas stream and the second gas stream so that the bond layer has a larger particle size distribution than the cold spray deposit layer.

18. The method of claim 1, further comprising:
applying the bond layer with a nozzle of a Low Pressure Cold Spray (LPCS) system; and
applying the cold spray deposit layer with a supersonic nozzle of a High Pressure Cold Spray (HPCS) system.

19. The method of claim 18, further comprising:
setting a gas pressure of the LPCS system to a first pressure between 100-400 pounds per square inch (psi) for applying the bond layer; and
setting a gas pressure of the HPCS system to a second pressure between 300-1,000 psi for applying the cold spray deposit layer.

20. The method of claim 18, further comprising:
setting a heater of the LPCS system to a first temperature between 200-300 degrees Celsius for applying the bond layer; and
setting a heater of the HPCS system to a second temperature between 300-1,000 degrees Celsius for applying the cold spray deposit layer.

* * * * *